US008391935B2

(12) United States Patent
Wickman et al.

(10) Patent No.: US 8,391,935 B2
(45) Date of Patent: Mar. 5, 2013

(54) MULTIFUNCTION MOBILE DEVICE HAVING A MOVABLE ELEMENT, SUCH AS A DISPLAY, AND ASSOCIATED FUNCTIONS

(75) Inventors: Marianna Wickman, Seattle, WA (US); William D. Webb, II, San Francisco, CA (US); Jesse S. Madsen, Oakland, CA (US); Randy Meyerson, Seattle, WA (US); Feridoon Malekzadeh, Seattle, WA (US); Jennifer Sadler, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 555 days.

(21) Appl. No.: 12/409,469

(22) Filed: Mar. 23, 2009

(65) Prior Publication Data

US 2010/0240417 A1    Sep. 23, 2010

(51) Int. Cl.
*H04M 1/00* (2006.01)

(52) U.S. Cl. .................. 455/575.4; 455/550.1; 455/566; 455/574

(58) Field of Classification Search ................ 455/575.4
See application file for complete search history.

(56) References Cited

U.S. PATENT DOCUMENTS

| 7,107,018 | B2 | 9/2006 | Jellicoe |
| 7,252,511 | B2 | 8/2007 | Santos et al. |
| D565,532 | S | 4/2008 | Arnold |
| 7,400,913 | B2 | 7/2008 | Richter et al. |
| 7,660,410 | B2 | 2/2010 | Mizushina |
| 7,777,679 | B2 * | 8/2010 | Lim et al. ...................... 343/702 |
| 2002/0058527 | A1 * | 5/2002 | Kawasaki et al. ............. 455/550 |
| 2004/0214610 | A1 | 10/2004 | Tanemura et al. |
| 2005/0070348 | A1 | 3/2005 | Lee et al. |
| 2005/0104856 | A1 | 5/2005 | Jacobs et al. |
| 2006/0056141 | A1 | 3/2006 | Pihlaja et al. |
| 2006/0063569 | A1 | 3/2006 | Jacobs et al. |
| 2006/0135229 | A1 | 6/2006 | Kwak et al. |
| 2006/0293093 | A1 | 12/2006 | Marcus |
| 2007/0053145 | A1 | 3/2007 | Finke-Anlauff et al. |
| 2007/0080950 | A1 | 4/2007 | Lee et al. |
| 2007/0123322 | A1 | 5/2007 | Mizushina |
| 2007/0135097 | A1 * | 6/2007 | Rahkonen .................. 455/412.1 |
| 2007/0153465 | A1 | 7/2007 | Shih et al. |

(Continued)

FOREIGN PATENT DOCUMENTS

| JP | 2007179525 A | 7/2007 |
| JP | 2008042265 A | 2/2008 |

(Continued)

OTHER PUBLICATIONS

International Search Report and Written Opinion for PCT/US2010/027873, Filed on Mar. 18, 2010, Applicant: T-Mobile USA, Inc., Date of Mailing Nov. 4, 2010, 11 pages.

*Primary Examiner* — Marcos Batista
*Assistant Examiner* — German Viana Di Prisco
(74) *Attorney, Agent, or Firm* — Perkins Coie LLP

(57) ABSTRACT

A mobile device is configured to operate in at least three modes that provide increased functionality, increased power consumption, and/or increased user input/output. In one example, the mobile device includes a first mode where some electrical components are powered down, and a secondary display may provide some information to a user. In a second mode, a primary display is energized and an audio mode is initially activated. A third mode provides full or nearly full functionality and/or user input/output.

25 Claims, 8 Drawing Sheets

U.S. PATENT DOCUMENTS

| | | |
|---|---|---|
| 2007/0213034 A1* | 9/2007 | Cai et al. .................... 455/412.1 |
| 2007/0254730 A1 | 11/2007 | Kim et al. |
| 2007/0287512 A1 | 12/2007 | Kilpi et al. |
| 2007/0293286 A1 | 12/2007 | Park et al. |
| 2008/0039155 A1 | 2/2008 | Kim |
| 2008/0064448 A1 | 3/2008 | Huang |
| 2008/0080919 A1 | 4/2008 | Rak et al. |
| 2008/0207272 A1 | 8/2008 | Thornton et al. |
| 2008/0232070 A1 | 9/2008 | Kuwajima et al. |
| 2008/0242343 A1 | 10/2008 | Koh et al. |
| 2008/0287169 A1 | 11/2008 | Kim et al. |
| 2008/0304218 A1 | 12/2008 | Park et al. |
| 2009/0005135 A1 | 1/2009 | Lindgren et al. |
| 2009/0093242 A1 | 4/2009 | Bhalekar et al. |
| 2009/0153470 A1* | 6/2009 | Chen et al. .................... 345/156 |
| 2009/0286580 A1* | 11/2009 | Murakoso et al. ......... 455/575.4 |
| 2010/0056222 A1* | 3/2010 | Choi et al. .................... 455/566 |
| 2010/0103054 A1* | 4/2010 | Shi et al. ....................... 343/702 |
| 2010/0240402 A1 | 9/2010 | Wickman et al. |
| 2010/0240425 A1 | 9/2010 | Madsen et al. |

FOREIGN PATENT DOCUMENTS

| | | |
|---|---|---|
| KR | 20050035455 A | 4/2005 |
| KR | 20060057402 A | 5/2006 |
| WO | WO-2007140911 A1 | 12/2007 |

* cited by examiner

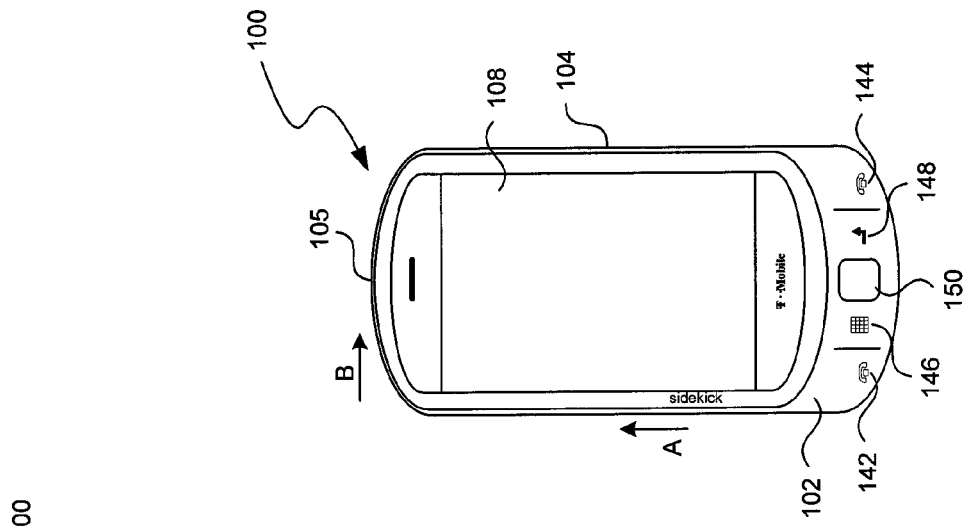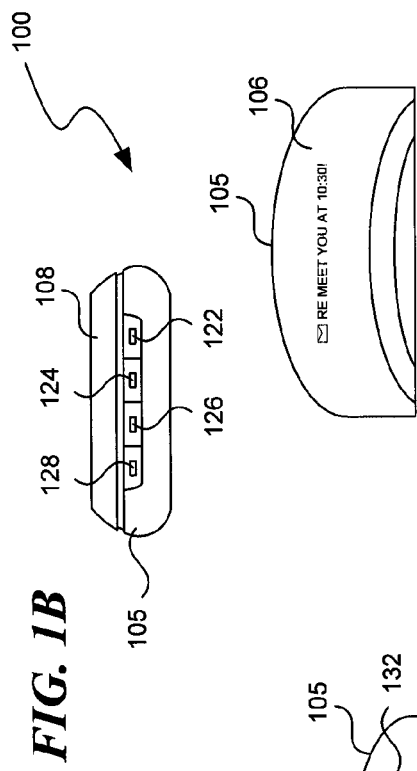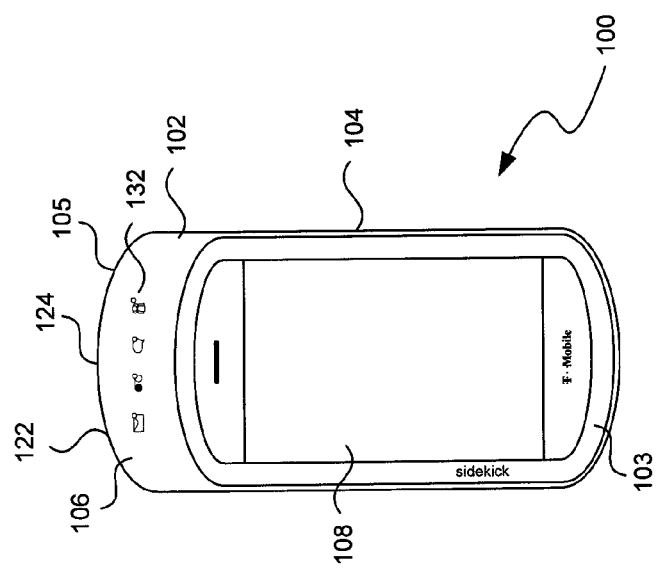

MULTIFUNCTION MOBILE DEVICE HAVING A MOVABLE ELEMENT, SUCH AS A DISPLAY, AND ASSOCIATED FUNCTIONS

BACKGROUND

Currently, mobile devices and related accessories facilitate communication in a number of different ways: users can send email messages, make telephone calls, send text and multimedia messages, chat with other users, and so on. That is, mobile devices allow users to not only make voice calls, but also send written messages via email, instant messaging ("IM"), texting via short messaging service (SMS) or multimedia messaging service (MMS), messaging via social networks (often over the internet protocol (IP)), etc. Moreover, mobile devices can play music, games, videos, and so on. As these devices have added features and become more powerful, users have also demanded that the devices become smaller and more portable.

Some mobile phones provide a traditional numeric keypad along with a few additional buttons. Other mobile devices provide a full alphanumeric keyboard, or a touch screen that depicts the keyboard. Many of these devices include a display and a keypad/keyboard that can move relative to each other. For example, flip phones have a display that can pivot relative to the keyboard, while many smart phones have a keyboard that can slide relative to the screen. The flip phones may include a small secondary display on a top of the phone to display time, signal strength, battery level, and/or a phone number of a calling party.

While these arrangements have been successful for many devices, there is a continual need to improve the overall arrangement and compactness of mobile devices. Further, as the mobile devices add more features, e.g. digital music players, the devices must include additional buttons, e.g. play, stop, reverse and fast forward buttons for the music player. These additional buttons add to the complexity and cost of the device. Alternatively, the device could provide buttons that implement two or more functions, such as a "4" key that also rewinds a music track. However, such dual, or even triple, use of buttons can become confusing to users.

The need exists for a system that overcomes these problems and progresses the state of the art, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 1A is a top view of a mobile device in a first or passive configuration.

FIG. 1B is an elevational view of a bottom of the mobile device of FIG. 1A.

FIG. 1C is an enlarged portion of the mobile device of FIG. 1A.

FIG. 1D is a top view of the device of FIG. 1A in a second or active configuration.

DETAILED DESCRIPTION

Figure 1E:
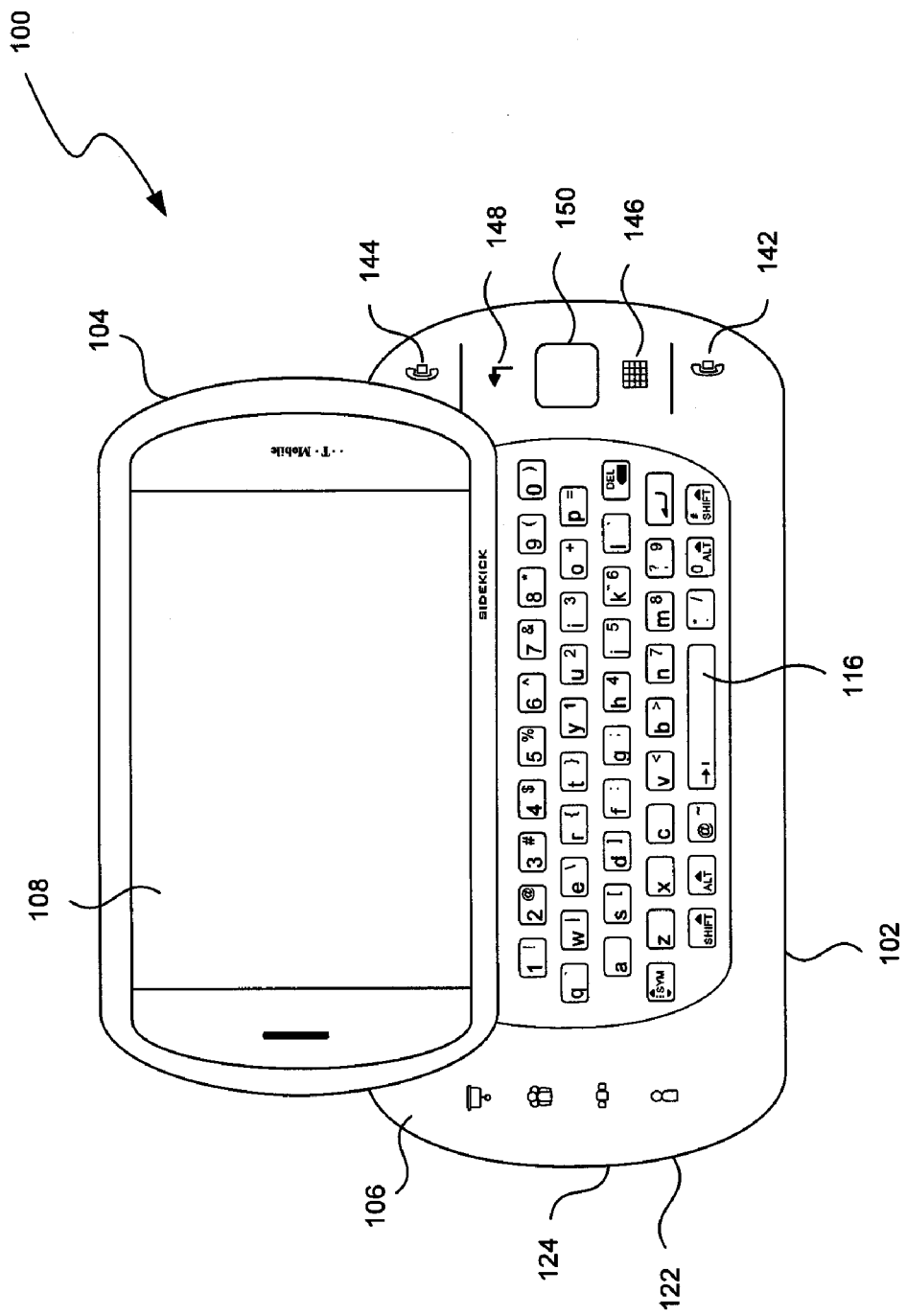
FIG. 1E is a top view of the mobile device of FIG. 1A rotated counter-clockwise 90 degrees, and in a third or keyboard configuration.

Described in detail below is a mobile device that has at least three modes or levels of engagement for a user. The modes of engagement can be selected based on movement of an element on the mobile device to a first, second or third position. In one example, the mobile device employs two displays, one of which may be smaller than the other. The smaller display may allow the device to operate in a low power mode or Passive Mode, yet continue to provide essential information to the mobile device user, such as message status, e-mail status, voicemail status, etc. The device allows the larger display to be moved and thereby cause the mobile device to enter two other modes, a Semiactive Mode to access some applications/communications and an increased user interface set (e.g. to voice calls), and an Active Mode that permits a much broader range of applications and communications and full or greatly expanded user interface set (e.g. emails, IM, chat/text messaging, video playback, capturing digital pictures, etc.).

In another example, the small, secondary display is not visible in the Semiactive Mode (it may be covered by the primary display 108), but provides visual indication to users via function buttons that may be accessed or used during specific applications employed while in either the Semiactive Mode or the Active Mode. The device may further maintain state while transitioning between modes, such that if the device is displaying a video or playing back digital audio while in the Active Mode and the larger display is moved to cause the device to enter the Passive Mode, the mobile device may stay in a Active Mode so that the video or audio playback is not disrupted.

Many specific details of certain embodiments of the disclosure are set forth in the following description and Figures to provide a thorough understanding of these embodiments. Well-known structures, systems, and methods often associated with such systems have not been shown or described in detail to avoid unnecessarily obscuring the description of the various embodiments of the disclosure. In addition, those of ordinary skill in the relevant art will understand that additional embodiments may be practiced without several of the details described below.

The headings provided herein are for convenience only and do not necessarily affect the scope or meaning of the claimed invention.

Suitable System with Three Operating Modes

As discussed herein, a mobile device having, for example, at least two displays and associated functionality provides users with a rich telecommunications experience. The mobile device provides for multitasking and allows users to be constantly connected to others, such as those in their social network. Fewer buttons need to be provided on the mobile device through the use of specific modes; a display screen, in a given mode, provides to the user an interface that intuitively provides or presents those input options the user requires in that mode while omitting other options. For example, for voice communications such as voice calls, a full physical keyboard may not be necessary. The visual complexity is thus reduced.

The secondary display can be used to display icons or functions associated with function keys, where those keys are programmed to perform different functions based on not only the current state of the mobile device, but also on an application currently active on the device. While hardware buttons are generally described herein, the device may include one or more touch sensitive screens.

Overall, the device provides for escalating user engagement and power management, based upon the physical position of a primary display. In a first "whisper," "check" or Passive Mode, the device allows users to check status of miscellaneous device functions or applications, such as e-mails received, text messages received, alerts received, voicemails waiting, etc. While in Passive Mode, the device conserves power. In a second Semiactive Mode, the device provides more functionality to the user so that the user can, for instance, initiate or receive voice calls, launch certain device applications, in some embodiments, interact with device applications via touchscreen functionality, while omitting functionality that is not necessary to those applications, such as a physical keyboard. In Semiactive Mode, the mobile device 100 presents to the user a greater set of user input devices or options and greater set of user output than in the Passive Mode (e.g. more input buttons and a larger display to provide more information to the user). In a third, fully Active Mode, the device provides all functionality, including a full keyboard permitting alphanumeric entry via a physical, as opposed to touchscreen, keyboard. In Active Mode, the mobile device 100 presents to the user an even greater set of user input options and user output than in the Semiactive Mode (e.g. all input buttons, both the primary and secondary displays, all with more information and options presented to the user). In other words, the Active mode provides to the user all or nearly all of the functionality available to the user via the mobile device 100; the Semiactive mode provides to the user a proper subset of the functionality available via the mobile device; and, the Passive Mode provides to the user limited functionality—a proper subset of the Semiactive mode functionality.

Referring to FIGS. 1A, 1B, 1C, 1D and 1E, a mobile device 100 that provides two displays and three operating modes is shown. The term "mobile device" may encompass any of a myriad of telecommunication devices such as cellular phones, VoIP phones, personal digital assistants, portable computers, mini computers, programmable consumer electronics, media players, gaming devices and so on. Such mobile devices may include a central processing unit, memory, input devices (e.g., keypads and input buttons) and output devices (e.g., display devices), as described herein. Mobile devices may also include hardware and operating instructions stored in memory for wirelessly transmitting and receiving data according to one or more wireless protocols. Such protocols include short range protocols (e.g., Bluetooth, Wi-Fi, Ultra-wideband, and ZigBee) and radio-access network protocols (e.g., GSM (Global System for Mobile Communications), CDMA (Code Division Multiple Access), UMTS (Universal Mobile Telecommunications System), EDGE (Enhanced Data for GSM Evolution), LTE (Long Term Evolution), Wimax (Worldwide Interoperability for Microwave Access), Voice Over Internet Protocol (VoIP), UMA/GAN (Unlicensed Mobile Access/Generic Access Network)).

FIGS. 1A, 1D and 1E are top views of the mobile device 100 in first, second, and third operating modes, respectively. The mobile device 100 includes a first housing portion or component 102 and a second housing portion or component 104 carried by and movably engaged with the first housing portion 102. In the example described below, the first housing portion 102 forms a body of the mobile device and carries a smaller secondary display 106; the second housing portion 104 includes a larger display 108 within a movable display housing. Details on mechanisms for moving the first and second portions relative to one another are provided in the assignee's concurrently filed and co-pending U.S. patent application Ser. No. 12/409,433, entitled, "MOBILE DEVICE HAVING A MOVABLE DISPLAY AND ASSOCIATED SYSTEMS AND METHODS."

FIG. 1A, for example, is a top view of the mobile device 100 in the first or Passive Mode. As described in greater detail below, the second housing portion 104 and larger display 108 can move relative to the first housing portion 102 into at least three different operating positions and thereby change operating modes of the mobile device 100. In the example described below, the second housing portion 104 and larger display 108 are moved by the user between operating modes, although another element or portion of the mobile device could be moved to select modes. For example, the mobile device may have a three position hardware switch, or have a cover to protect buttons and/or display elements for the mobile device, either of which can be moved to select a desired operating mode.

In the Passive Mode, the second housing portion 104 and larger display 108 are positioned adjacent to a first or bottom end 103 of the first housing portion 102. The Passive Mode is a low engagement mode for the mobile device 100 in which the larger display 108 is typically turned off or operates for limited periods of time in order or in a reduced manner to preserve device power, and the mobile device otherwise operates in a low power mode. One advantage of this operating mode is that a user can receive instant or approximately instant notification of, for example, incoming messages (via the secondary display 106 or "status bar") without having to power on the larger display 108. Keeping the larger display 108 off or in a reduced state can significantly reduce the power consumption of the mobile device 100 and, accordingly, extends battery life of the device. Moreover, the user can still receive a stream of information regarding device functionality (e.g., emails, text messages, alerts, voicemails received, etc.) via the secondary display 106 because radio components are still operating, but in a lower power state.

As best seen in FIGS. 1A and 1C, a top end 105 of the first housing portion 102 includes the secondary display 106 having one or more status indicators or icons 132 configured to provide information about the mobile device 100 (e.g., phone calls, e-mail messages, text messages, voicemail messages, social networking messages, etc.), or other types of information. The status indicators 132 can include icons associated with e-mail messages, voicemail messages, text or chat messages and/or social networking messages, each of which may also include a number or counter indicating a total number of new messages received but that have not yet been opened or viewed. In other embodiments, the status bar 130 can have a different configuration and/or include different features.

Figure 5:
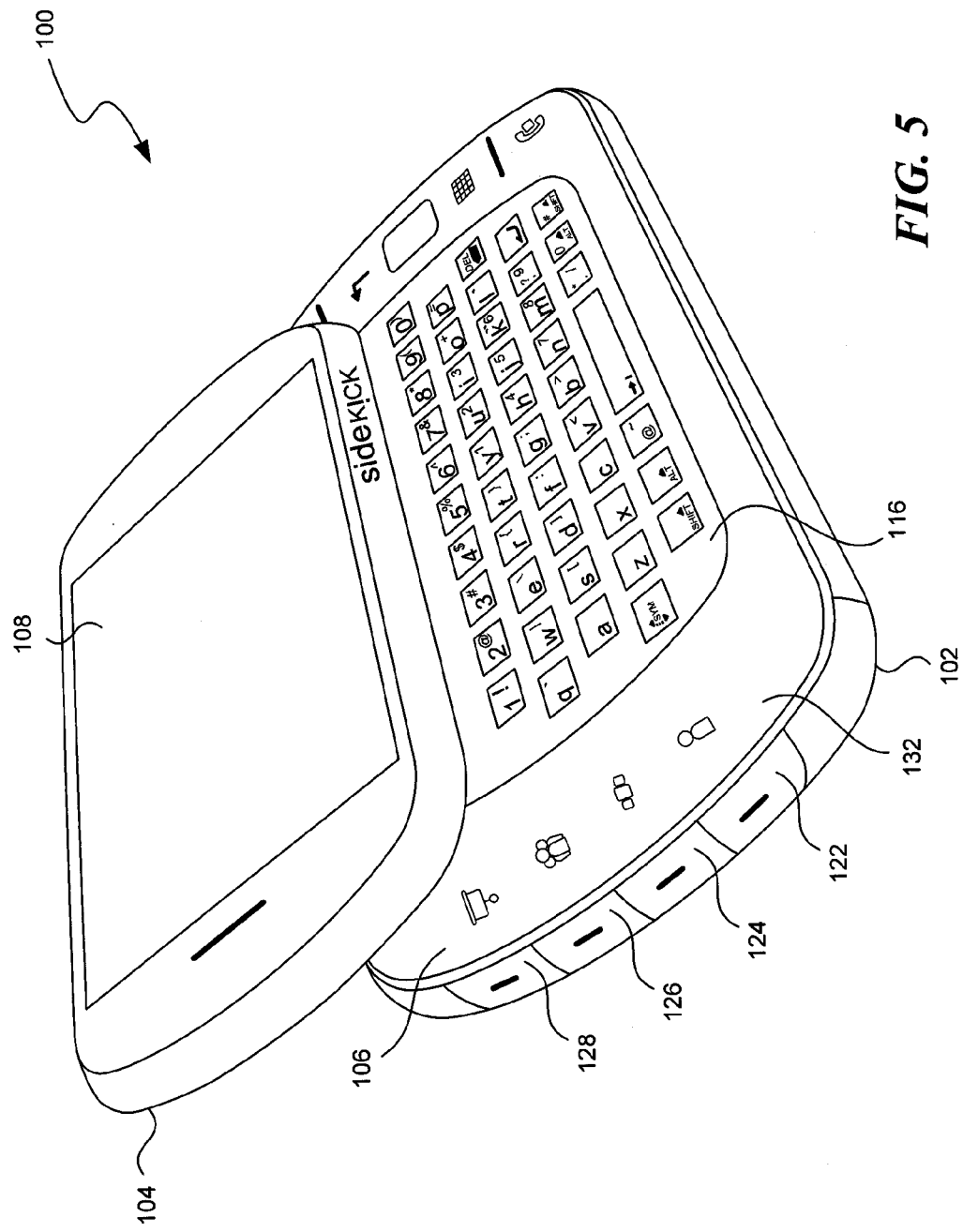
FIG. 5 is a top front perspective view of the mobile device in the configuration of FIG. 1E.

FIG. 1C shows an example of a new incoming message, a portion of which is displayed on the secondary display 106. As shown in FIG. 1C, a new e-mail message has been received by the mobile device, and the secondary display 106 provides a scrolling display that begins with an e-mail icon, followed by a subject line of the e-mail message, in this case "RE: Meet You At 10:30!". While an e-mail message is shown, information regarding other messages may likewise scroll across the secondary display 106 when they are received, such as the phone number and/or name of a calling party who has left a voicemail, or, for example, the first 30 characters of a social networking message. Thus, in the example of FIGS. 1A and 1B, the user can interact with received messages via secondary or functional keys 122, 124, 126 and 128 to provide one or a limited number of user interactions with e-mail messages, voicemail messages, chat messages, and social networking messages, respectively. (FIG. 5 shows function buttons 122-128 more clearly. While shown as hardware buttons, the secondary display 106 may be a touchscreen and the function buttons 122-128 may be areas of the touchscreen associated with icons displayed at those areas.)

FIG. 1B shows a bottom edge of the mobile device 100, which has secondary or function buttons 122-128 aligned and associated with one of the icons displayed on the secondary display 106. These buttons, in Passive Mode, allow the user to interact with received messages. For example, the user can activate the first button 122 associated with e-mail to cause the secondary display 106 to again display the subject line for the most recently received e-mail. Similar functions may apply to the other function buttons. Further details on operation of the secondary screen may be found in assignee's U.S. Pat. No. 8,023,975, entitled, SECONDARY STATUS DISPLAY FOR MOBILE DEVICE.

As discussed above, the mobile device 100 is in the first or Passive Mode when in the configuration shown in FIG. 1A. Referring next to FIG. 1D, the second housing portion 104 and larger display 108 are slidably moved laterally relative to the first housing portion 102 (as shown by arrow A in FIG. 1D) in a plane parallel to that of the secondary display 106, to position the second component adjacent to a top end 105 of the first housing portion 102 and put the mobile device 100 in the Semiactive Mode.

FIG. 1D shows the second housing portion 104 and larger display 108 positioned adjacent to a second or top end 105 of the first housing portion 102 to put the mobile device 100 into the Semiactive Mode. The Semiactive Mode is primarily or initially a phone mode in which the mobile device 100 is configured for providing a subset of device functionality. For example, the mobile device may provide user access only to voice communication functionality (thereby making the Semiactive Mode a voice calling mode) or may provide user access to all user functionality except for the physical keyboard 116. Thus, although the mobile device 100 may be able to at least receive phone calls in one or both of the Passive Mode and the Active Mode, the Semiactive Mode may be the primary operating mode for making/receiving phone calls. Therefore, the user of mobile device 100 may initially be presented with a home screen user interface associated with voice communications upon switching the mobile device 100 to Semiactive Mode. In another example, the Semiactive Mode provides to the user only a subset of all applications available via the mobile device 100. (When a user in Semiactive Mode and during a call moves the larger display 108 back into the Passive Mode, the user may thereby hang up or otherwise terminate the call).

As shown in FIG. 1D, the first housing portion 102 includes or carries a number of input/output components and other electronic and mechanical components for the device 100. For example, the mobile device 100 includes a send button 142, an end button 144, a menu button 146, a back button 148, and a trackball or input pad 150. As described below, the first housing 110 can also include a number of other input components (e.g., a camera, etc.) to accept input from a user, output components (e.g., headphone port, speaker, etc.) to provide feedback to a user, and communication ports (e.g., USB port, etc.) for connecting the mobile device 100 to an external device (e.g., a personal computer).

The second housing portion 104 includes a display housing movably engaged with the first housing 110 and the display 108 (e.g., a liquid crystal display (LCD) or organic LCD (OLED), plasma display, electronic ink (eInk)) carried by the display housing. The display housing can also include a speaker (not shown) and a variety of other electronic or mechanical components. A user interfaces with the mobile device 100 via user input components (e.g., input buttons 112, a keyboard (FIG. 1E), touchscreen, microphone, voice recognition system, etc.) and/or user output components (e.g., screen 108, speaker, etc.).

As described below, the mobile device 100 can also include various other computing components, such as those generally found in smart phones, cellular phones, handheld e-mail devices, personal digital assistants (PDAs), tablet computers, gaming devices, or other such mobile devices, such as a power subsystem, data storage to store programs and data, and at least one data processor to run an operating system and a variety of different applications. The mobile device 100 can also include hardware and operating instructions stored in memory for wirelessly transmitting and receiving data according to one or more wireless protocols, as well as other hardware and/or software components.

FIG. 1E illustrates the mobile device 100 in a third or Active operating mode. The third mode is primarily a data mode where a full, physical on the mobile device 100 allows users to readily create messages or otherwise perform text entry. In this configuration, the second housing portion 104 has been pivotably, rotatably or transversely moved (as shown by arrow B in FIG. 1D) relative to the first housing portion 102 until the second housing portion 104 is offset from the first housing portion 102 to expose a keyboard 116 previously underneath the display 108. Further details regarding mechanisms for movement of the second housing portion 104 relative to the first component 102 are provided in the copending application noted above. In the illustrated embodiment, the keyboard 116 is a QWERTY keyboard. In other embodiments, however, the keyboard 116 can include other types of keyboards (e.g., Dvorak keyboard, QWERTZ keyboard, AZERTY keyboard, Colemak keyboard, etc.), and/or a touch pad, a handwriting tablet, or other suitable input components. The first and/or second housing portions 102 and 104 can also include other mechanical and/or electrical features (e.g., input buttons, displays, etc.) proximate to the keyboard 116.

Suitable Internal Systems and Network Configurations

Figure 2:
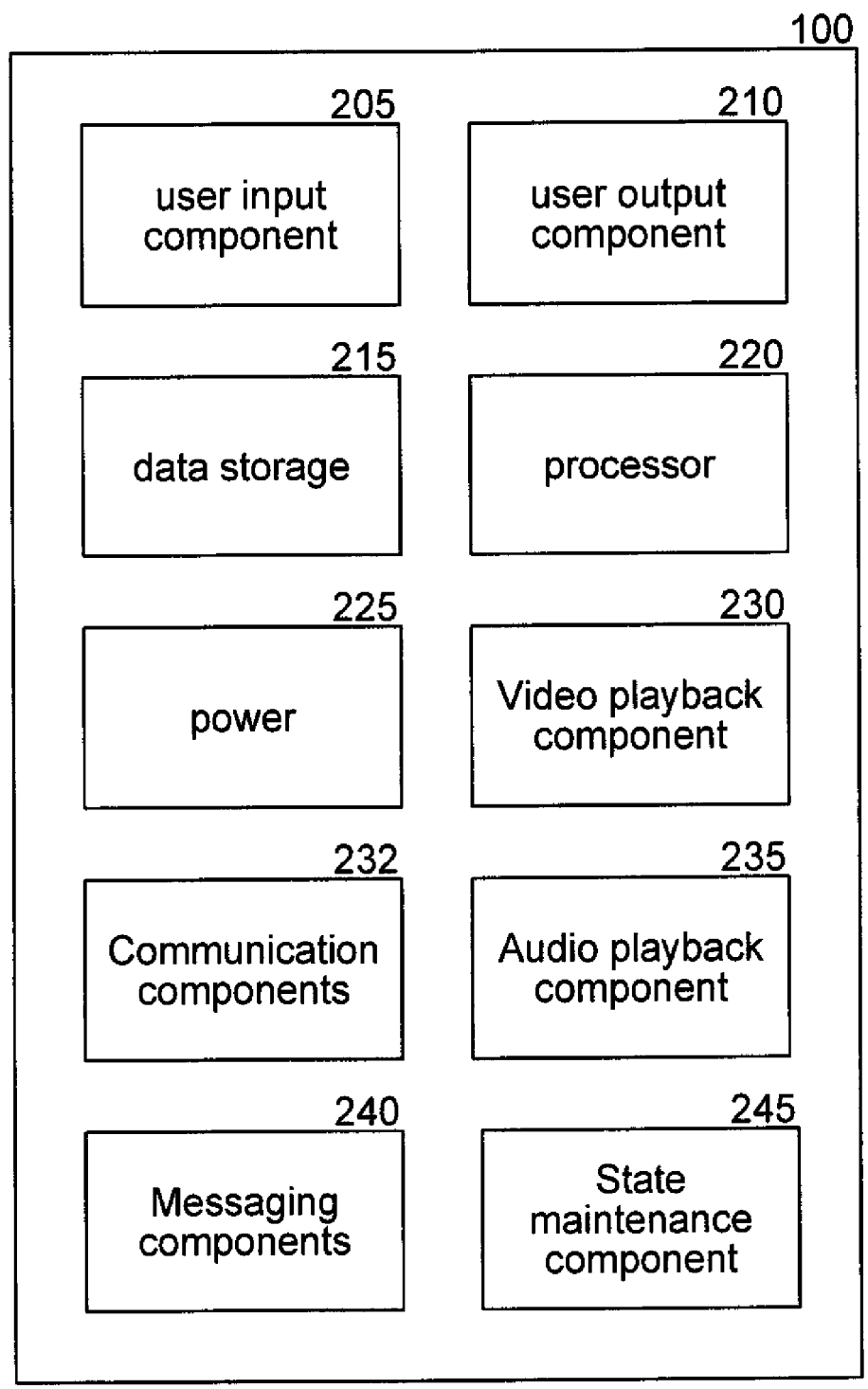
FIG. 2 is a block diagram illustrating examples of components for the mobile device.

Referring to FIG. 2, the mobile device 100 may contain a portable power subsystem 225 (e.g. battery, solar cell, or power conditioning circuit), data storage or memory 215 to store programs and data, and at least one data processor 220 to run an operating system and applications to implement the processes described herein. A user interacts or interfaces with the device via a user input component 205 (e.g., elements noted herein, including keypad, touchscreen, microphone, voice recognition system, an audio input port for use with an external wired/wireless microphone) and/or a user output component 210 (e.g., speaker, primary and secondary display devices, an audio output port for use with an external wired/wireless speaker/earphone). The mobile device also includes a communication network interface component 232 (such as a radio and/or wireless interface, an Enternet interface, a universal serial bus (USB) interface, and so on), and may include one or more wireless transceivers or components to establish communication channels with a network and/or other devices. The communication component 232 may establish any number of suitable communication channels including Bluetooth, Wi-Fi, Ultra-wideband, ZigBee, GSM, GPRS, EDGE, UMTS, CDMA, and so on.

The user input components 205 include a position sensor circuit configured to detect movement of the second housing portion 104 and/or larger display 108 and thus determine a desired mode for the mobile device 100. The position sensor circuit can generate three different signals for the processor 220 based on the position of the second housing portion 104 and/or larger display 108, and thus the processor can initiate the corresponding mode described herein.

The mobile device 100 may include messaging components 240 to permit the user to engage in multiple types of asynchronous text-based communication described herein. Thus, the messaging components 240 can include e-mail clients, social network messaging clients/twittering components, etc. Further, the mobile device may include certain applications, such as a video playback component 230 to permit the device to replay downloaded, streamed or locally stored videos. Further, the mobile device includes an audio playback component 235 to permit the device to replay digital audio files, such as mp3 files. While playback is described, the audio and video components may include functionality to permit users to create and/or edit video and/or audio files. Of course, other applications are possible including digital image capture, editing and replay where the mobile device may include a camera (not shown). The mobile device 100 may also contain other components and/or applications, such as a mapping component and a location determination component such as a global positioning system (GPS) component.

In the Passive Mode, the power component 225 and processor 220 power down the primary display 108 (user output component 210), unless video playback component 230 is active, as explained below. Further, the processor may shut down or put in a standby state messaging components 240 and aspects of the communication components 232, such as powering down a radio (e.g. WiFi radio), or operating transceivers at a lower power state, especially any transmit components. Other power saving features may likewise be employed.

In the Semiactive, the power component 225 and processor 220 power up the communication components 232. In the Fully Active Mode, the power component 225 and processor 220 further engage the messaging components 240 and, based on user input, may enable other components, such as the audio or video playback components 230 and 235. Thus, as the mobile device moves from the Passive Mode to the Semiactive Mode, and finally to the Active Mode, various aspects or functionality of the device escalate. For example, the amount of information provided or output to a user escalates from simple icons, message counters, and a temporarily displayed line of text in the Passive Mode to display of full color messages with text and/or images in Active Mode. Likewise, the array of user inputs available to a user similarly escalates from four function buttons 122-128 in the Passive Mode, to the microphone/audio input and buttons associated with making/ending calls, and finally to a full keyboard and other inputs in the Active Mode. All these modes of communication allow the user to stay connected to friends, family, and business associates and any other person or entity to which the user wishes to communicate with, over a variety of communication mediums and networks.

Figure 3A:
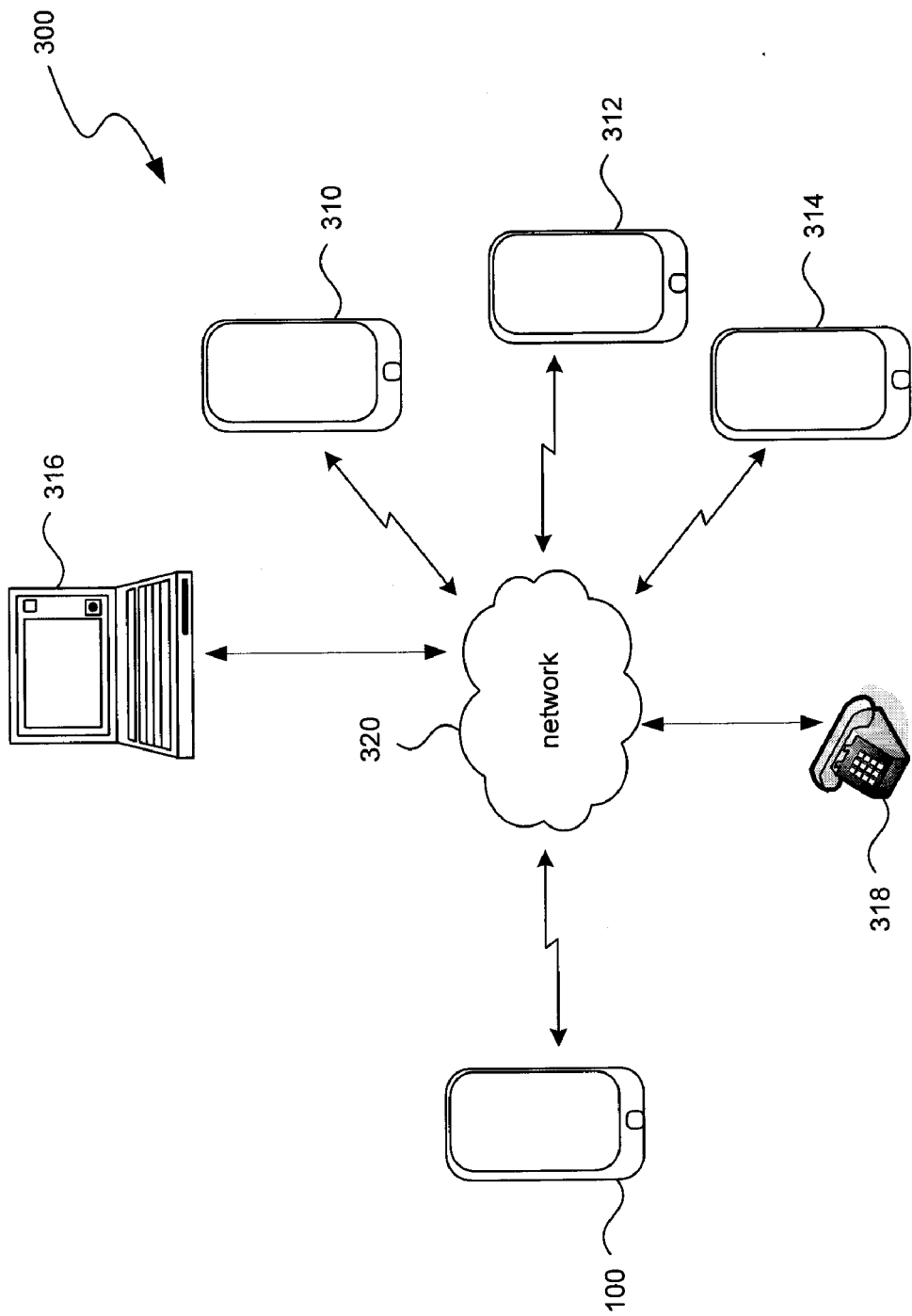
FIG. 3A is a diagram illustrating communication between the mobile device and other devices via a network.

Referring to FIG. 3A, a block diagram 300 illustrates a suitable system for exchanging various types of messaging between mobile devices, landline phones, computers, etc. Aspects of the system may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively or additionally, computer implemented instructions, data structures, screen displays, and other data under aspects of the system may be distributed over the Internet or over other networks (including cellular or IP-based telecommunications networks), on a propagated signal on a propagation medium (e.g., an electromagnetic wave(s), a sound wave, etc.) over a period of time, or they may be provided on any analog or digital network (packet switched, circuit switched, or other scheme).

The system 300 includes a mobile device 100 at a first location, a PC or laptop computer 316, a landline or fixed-line phone 318, two or more other mobile devices 210, 212, 214 (such as mobile devices from different manufacturers and associated with different wireless service providers/networks), and, in this example, a network 320 that provides communication links between the mobile devices, telephone, and PC, stores information associated with the mobile device PC, and sends and receives information from the mobile device PC. Although only one network 320 is shown, it will be understood that the devices of FIG. 3A may access each other via one or more other telecommunications networks, including, for example, one or more cellular networks, IP-based telecommunications networks, the Internet, peer-to-peer communications, circuit switched networks (e.g., POTS), etc., as discussed herein.

Thus, in one example, a user of the mobile device 100 may receive a voice message, an email message, and a text message from each of the different mobile devices 210, 212, and 214, all of which are temporarily displayed in the secondary display 106 as noted herein. The user can make a voice call to the landline phone 318 or to a VoIP phone via PC 316. Further, the user of the mobile device 100 can exchange text-based messages with the mobile devices 210-214, and the PC 316.

Figure 3B:
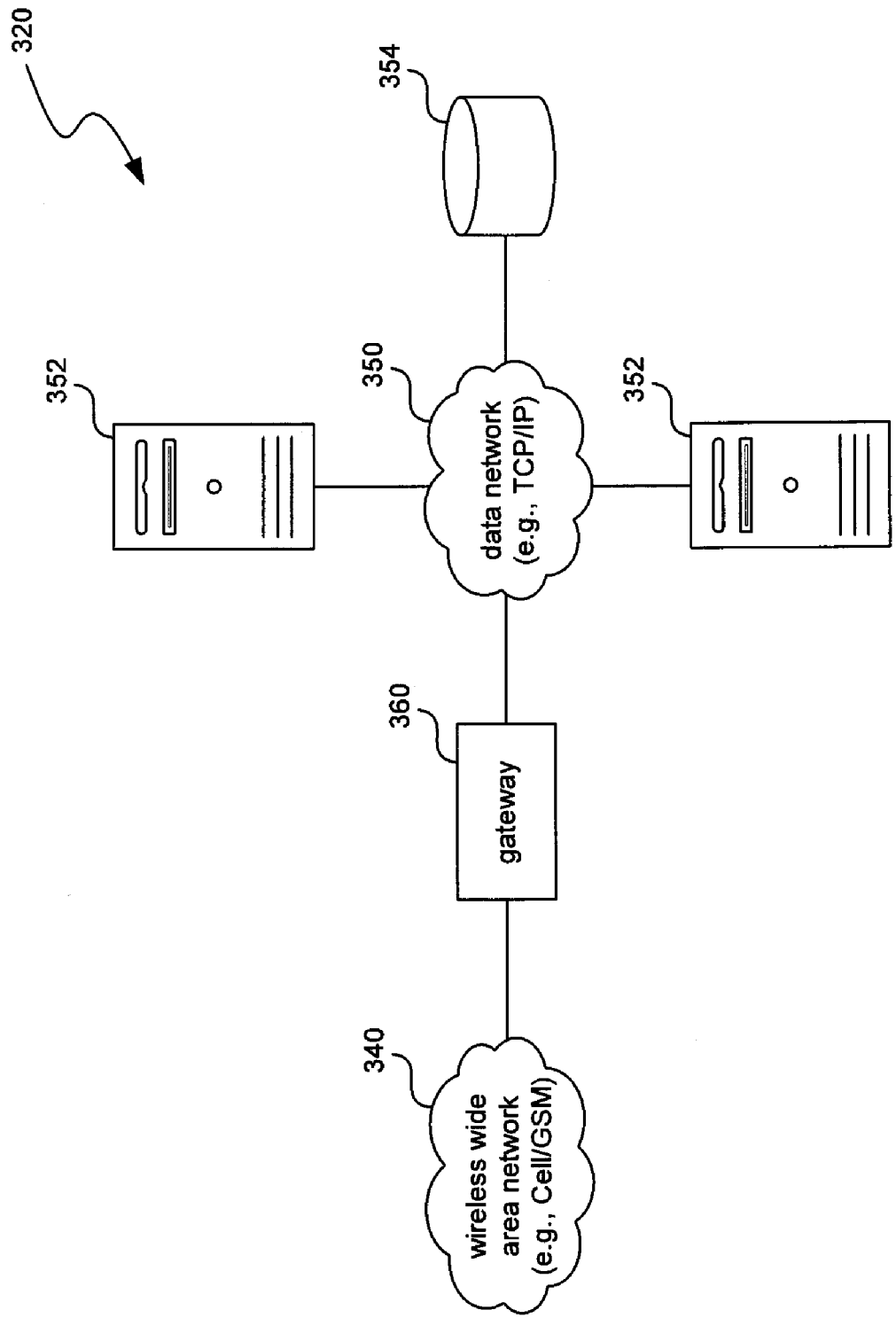
FIG. 3B is a diagram illustrating network components to facilitate communication with the mobile device.

Referring to FIG. 3B, a block diagram illustrating suitable components within the network 320 is shown. The network 320 includes a data network 350 (e.g., TCP/IP or other protocol), which one or more telecommunications networks 340 may access via a gateway 360. The network 320 may include or communicate with one or more servers 352, a network database 354, and so on. The servers 352 may assist in exchanging messages among the devices (e.g. devices of FIG. 3A), display and/or present information to users of the mobile devices described herein, such as information stored in the database 254, etc. The servers may include components similar to those shown in FIG. 2, including communication components that enable communication of information between the servers 252 and mobile devices, and other components. The network 320 may include or be part of any network capable of facilitating communications between devices, and is not limited to those shown in FIG. 3B. Examples include the wireless protocols noted above, as well as other protocols including Voice Over Internet Protocol (VoIP), TCP/IP, and other technologies.

The system may include one or more picocells communicatively coupled to a base station in a cellular network. A picocell is a wireless access point typically covering a relatively small area, such as within a building (e.g., office, shopping mall, train station, or the like) or within an aircraft, ship, train or other vehicle. A picocell may, for example, be analogous to a WiFi access point, except that it typically broadcasts using the licensed spectrum of an associated wireless carrier. The picocell serves as an access point for routing communication between device and the network. One or more picocells may be coupled to a base station controller (BSC) by way of wired or wireless connections.

Alternatively or additionally, the network includes an IP-based network that includes a VoIP broadcast architecture, UMA or GAN (Generic Access Network) broadcast architecture, or a femtocell broadcast architecture. Voice Over Internet Protocol, or VoIP, is a telecommunication system for the transmission of voice over the Internet or other packet-switched networks, and can include mobile devices specifically designed for usage under VoIP. Unlicensed Mobile Access or UMA, is the commercial name of the 3GPP Generic Access Network or GAN standard. Somewhat like VoIP, UMA/GAN is a telecommunication system which extends services, voice, data, and IP Multimedia Subsystem/Session Initiation Protocol (IMS/SIP) applications over IP-based networks. For example, a common application of UMA/GAN is in a dual-mode handset service in which device users can seamlessly roam and handover between local area networks and wide area networks using a GSM/Wi-Fi dual-mode mobile phone. UMA/GAN enables the convergence of mobile, fixed and Internet telephony, sometimes called Fixed Mobile Convergence. Femtocells are much like picocells—they broadcast within the licensed spectrum of a wireless telecommunications carrier. Femtocells are typically designed for use in residential or small business environments. Femtocells connects to the service provider's network much like UMA/GAN access points, namely over IP-based networks.

The database 354 can store personalized information for the user of the mobile device 100. For example, as described below, the function buttons 122-128 and secondary display 106 may be assigned different functions depending upon not only the current state of the mobile device, but also an application currently running on the device. The user may adjust the functions and icons associated with the function buttons 122-128 and the secondary display 106, respectively, and store such changes in a user profile stored in the network database 354. For example, when the mobile device 100 is playing an application such as a first-person shooter game, the application may set as defaults for the function buttons 122, 124, 126, and 128, the following respective functions: shoot, jump, crouch, and reload. The user may reconfigure functions associated with the function buttons 122, 124, 126 and 128, to be change weapon, run, turn left, and turn right, respectively. These changes would thus be added to the user's profile stored in the database 354 for that particular game so that the next time the user played that game, those presets for the function buttons would be enabled. This can be particularly helpful with network games where the user is playing a game with other users over the network 320. Many other examples are possible, including those presented below.

As another example, the network database 354 can be a network address book that stores contact information for friends and other contacts for the user. Rather than relying on an address book stored locally in the mobile device 100, the network address book may allow the user to have access to more current information regarding the user's contacts. Thus, phone numbers, email addresses, and other contact information for the user's contacts can be the most accurate and thereby help ensure that she stays connected to her contacts. More details regarding the network address book may be found in the assignee's U.S. Patent Application No. 2009/0093242 entitled, "SYSTEM AND METHOD FOR ACCOUNTS SET UP FOR MOBILE DEVICES, SUCH AS AN EMAIL ACCOUNT SETUP," filed May 5, 2008 (A. Bhalekar and M. Penwala, inventors).

Modal Operation of Mobile Device

Figure 4:
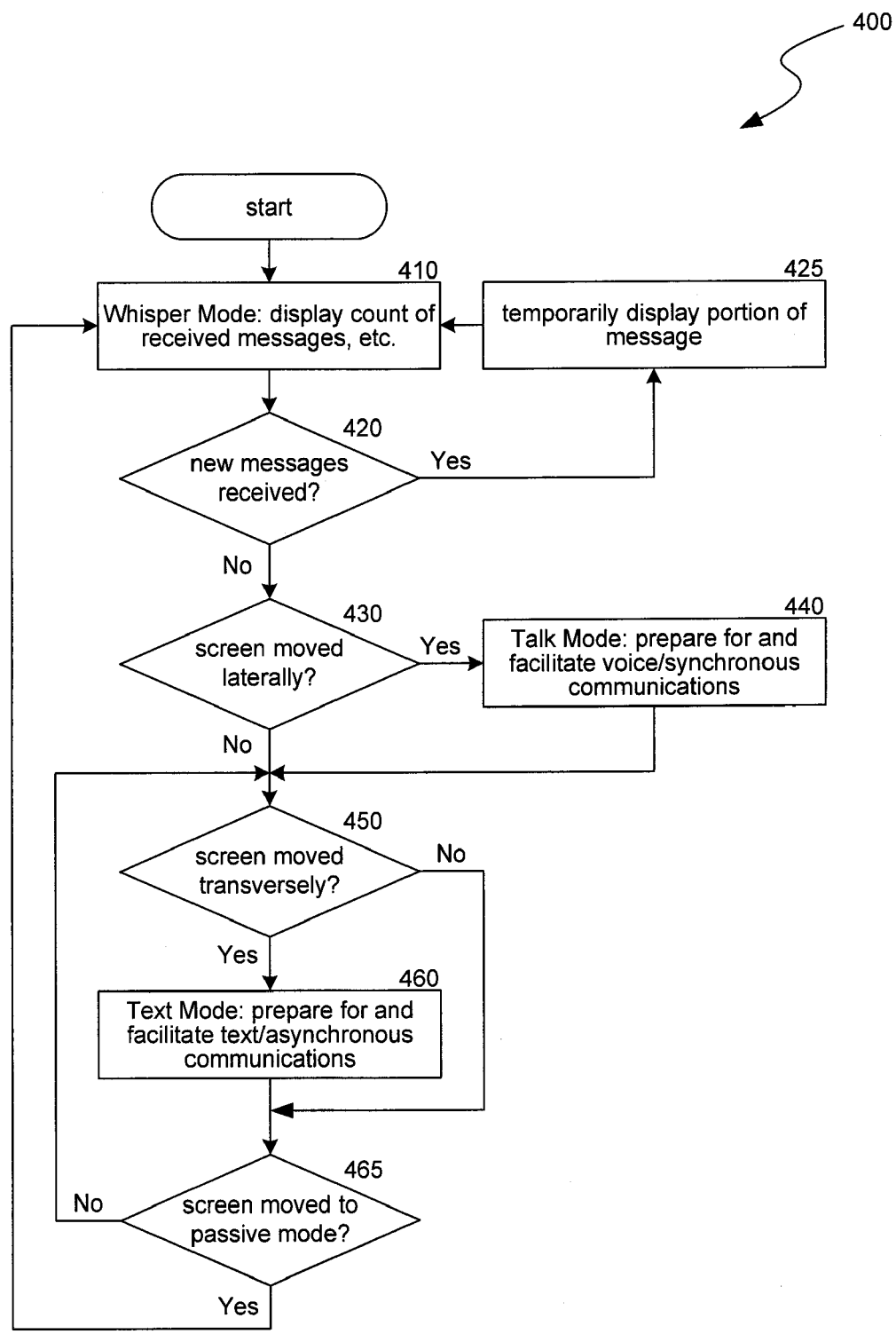
FIG. 4 is a flowchart illustrating a process for providing three modes of communication to the mobile device.

As discussed above, the mobile device 100 may move from increasing engagement modes, such as whisper-phone-text, or check-call-connect. Referring to FIG. 4, a flow diagram illustrating an example of a routine 400 for moving between modes is shown. Beginning in block 410, the mobile device 100 is in Passive Mode. As noted above, the device displays on the secondary display 106 a counter of received messages, and a scrolling text message of a subject line or other brief information regarding a newly received message. The radio is in a lower power mode to simply ping the network for any newly received messages. In block 420, the device determines whether any new messages are received, and if so temporarily displays a portion of those messages under block 425.

In block 430, the mobile device 100 determines whether the primary display screen 108 has been moved laterally. If so, then in block 440 the device enters Semiactive Mode and prepares for and primarily facilitates, for example, voice communications. In Semiactive Mode, the user can also read text or asynchronous communications without responding to those communications. The radio will be fully powered up to facilitate voice communications. Optionally, the mobile device may secondarily facilitate other device functionality, such as text messaging, e-mail, etc. Following blocks 430 or 440, the device determines whether the screen is moved transversely under block 450. If so, then in block 460, the device enters Active Mode and prepares for and facilitates all of the communication and application functionality available on or via the device. Following block 450 or 460, the device determines whether the screen has been moved to enter the Passive Mode (block 465). If so, then the routine 400 loops back to block 410; otherwise, the routine moves back to block 450.

When the mobile device moves into Active Mode, most or all functionality of the device is made available to the user. Referring to FIG. 5, the secondary display 106 may display information for the user in addition to the primary display 108, unlike in phone mode. The displayed icons 132 in the secondary display 106 are rotated 90 degrees clockwise, and more importantly, become visual indicators for functions associated with function buttons 122-128. The secondary display may be a dashboard for launching applications or functions on the mobile device 100. In the example of FIG. 5, a home screen for the secondary display 106 in Active Mode may provide access to certain user-preferred functions via the function buttons. For example, the function button 122 may permit the user to access and obtain a pull-down screen or "window shade" that displays an inbox and/or a really simple syndication (RSS) feed or running list of posts, messages or other information associated with a group of friends, individuals, organizations, sites, etc. previously selected by the user. The function button 124 may allow the user to quickly access a menu or user interface to allow her to contact, through any means noted herein, her selected, or "favorite", friends, individuals, organizations, etc. The function button 126 may be used to quickly access a user's predefined favorite applications on the mobile device or to access a home page/screen. The button 128 may permit the user to access and edit her profile (which may be stored in the network address book).

Thus, when the mobile device 100 is in Active Mode or in landscape orientation, the function buttons 122-128 become dedicated to a particular application currently active or running on the device. As another example to that noted above, a home or initial page of the primary display 108 in the Active Mode may provide all available applications to the user, but a home display for function buttons 122, 124, 126 and 128 may allow the user to send an e-mail, leave a voice message, send a text/chat message, or send a social networking message, respectively (see icons of FIG. 1A). To perform other functions, such as take a picture, watch a video, listen to music, view pictures, etc., the user must access the corresponding application from a main menu of applications displayed on the primary display 108. If the user selects the option to send an e-mail (e.g. via function button 122), the mobile device launches the e-mail client and may display the user's inbox of messages. When the user selects the option to create a new message, then the function buttons 122-128 may then be dedicated to perform functions specific to the active application, such as insert an emoticon, insert a picture, insert specific formatting, and attach a file, all with appropriate icons 132 displayed in the secondary display 106. As another example, the mobile device 100 in FIG. 5 may be executing an instant messaging or chat mode application. Function button 122 then may become associated with sending a chat message to an individual, while button 126 would allow the user to send a chat message to a group. Button 128 would allow the user to provide a do not disturb state to fellow instant messaging users, while button 124 would allow access to certain chat functions.

Overall, in keyboard mode, both the larger display 108 and the secondary display 106 display information for the user. The operating system running on the mobile device 100 provides appropriate application programming interfaces (APIs) that enable applications running on the mobile device to use not only the larger display 108, but also the secondary display 106. Thus, in the example above, the email application or chat application includes specific functionality to specify icons or labels for the function buttons 122-128, depending upon a current mode or status of the application (e.g., preparing a new email message or chat message). While the secondary display 106 displays supplementary information, users may still receive full information on the primary display device. The examples above show how the secondary display provides users with quick access to certain functions also available via the primary display. However, the secondary display may provide other supplementary information to users beyond short cuts to desired applications, or to desired functions within applications. For example, the secondary display may be an extension of the primary display so as to display other information. Such other or supplementary information can include: a list of tabs (e.g. for tabbed browsing); a list of favorite links; a list of recently opened/edited files; to display changing data, such as a news feed, stock ticker (e.g. when executing a stock viewing application/site), or other RSS/browser accessed information (e.g. social networking feed of recent posts/messages from friends), or display other information. Further examples can include displaying an equalizer when the mobile device is executing a digital audio player, or providing a list of friends within a predetermined geographic radius under a location-based service.

The current operating state or application of the mobile device 100 not only can specify what to display in the secondary display 106, but also provide further features to a user depending upon the current state of the device and/or depending upon transitions between states. Consider one example where the mobile device 100 is in Active Mode. The instant messaging application is active, and the user is replying to a chat message from an instant messaging contact. The mobile device then enters Semiactive Mode. As a result, the mobile device provides certain shortcuts to the user based on predetermined assumptions. In this example, the mobile device assumes that the user wishes to call the instant messaging contact who was the subject of the most recent chat message. The mobile device thus accesses the network address book stored in the network database 354 and obtains the phone number(s) associated with that contact so that those numbers are available and displayed to the user in phone mode. The user can thus simply press the Call or Send button 142, rather than having to find the appropriate number. Thus, when moving from Active Mode (while executing an application associated with a message/message) to the Semiactive Mode, the phone number or phone numbers for contact(s) involved in the message while in keyboard mode can be retrieved from memory and made readily available to the user to quickly establish a call. Other examples are, of course, possible.

Figure 6:
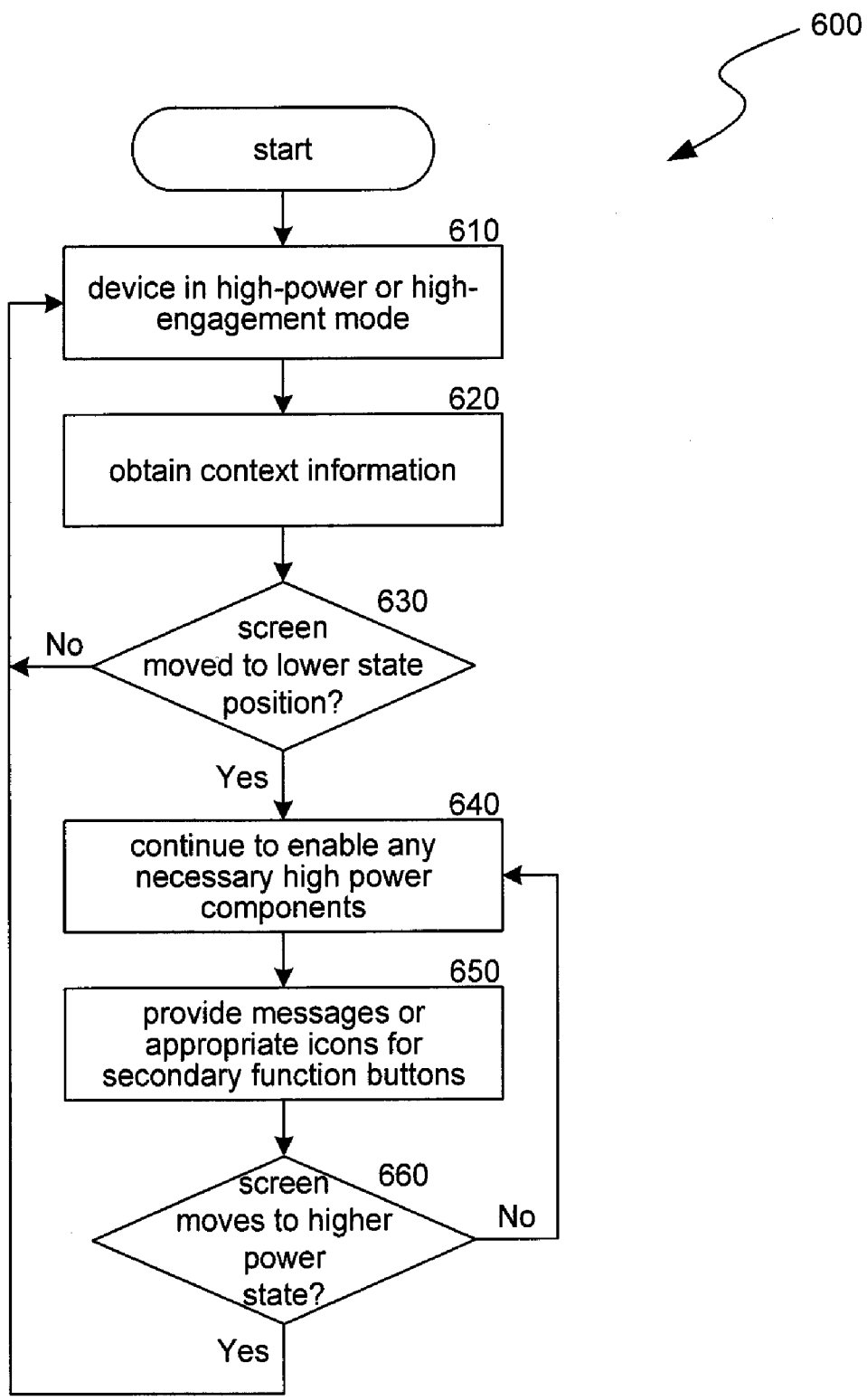
FIG. 6 is a flowchart illustrating a process for transitioning between states for the mobile device.

Referring to FIG. 6, an example of a routine 600 is shown for maintaining states or functionality as the mobile device moves between modes. Beginning in block 610, the mobile device 100 is in an Active Mode of FIG. 5. The user selects to replay a video. In block 620, the device obtains context information, such as determining that a previous chat message was viewed or a video is currently being played back and has not been paused or stopped. In block 630, the mobile device determines that the primary display 108 has moved to a lower engagement mode or lower state position, which moves the device into the passive or phone state. If it has so been moved, then in block 640 the mobile device 100 continues to enable any necessary high power components. In this example, the processor 220 continues to power up the primary display 108 and output audio via the speaker (user output components 210). In block 650, the mobile device provides messages or appropriate icons for function buttons 122-128 via the secondary display 106. In this example, the user puts the primary display 108 into the Passive Mode. As a result, the secondary display 106 displays icons for pause, rewind, fast forward, and stop, associated respectively with function buttons 122 through 128. In block 660, the process 600 determines whether the screen 108 has moved to a higher power state. If not, it loops back to block 640, but if it does move, then the process loops up to block 610.

While the example above has been applied to video playback, the same is true for music playback where the secondary display 106 may show, for example, a scrolling display of song title, artist, etc. In camera mode, the primary display 108 can show the field of view for the camera (with camera optics provided on an underside of the mobile device (not shown)), and the function buttons 122-128 can provide functions to take a picture, delete a picture, replay a picture, or enable certain options such as flash, zoom, fast shutter speed, etc.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the system is not intended to be exhaustive or to limit the system to the precise form disclosed above. While specific examples for the system are described above for illustrative purposes, various equivalent modifications are possible within the scope of the system, as those skilled in the relevant art will recognize.

While processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the system provided herein can be applied to other systems, not necessarily the system described above. The elements and acts of the various examples described above can be combined to provide further implementations of the system. Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Other changes can be made to the system in light of the above Detailed Description. While the above description describes certain examples of the system, and describes the best mode contemplated, no matter how detailed the above appears in text, the system can be practiced in many ways. Details of the system may vary considerably in its specific implementation, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly defines such terms. Accordingly, the actual scope of the system encompasses not only the disclosed examples, but also all equivalent ways of practicing or implementing the system under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to add additional claims after filing the application to pursue such additional claim forms for other aspects of the invention.

We claim:

1. A portable telecommunications device for use with a wireless communications network, the portable telecommunications device comprising:
    a wireless transceiver;
    at least one antenna;
    user input components, including an audio input component configured to facilitate voice communications, and a keyboard configured to facilitate text communications;
    user output components, including an audio output component configured to facilitate voice communications;
    digital memory;
    at least one processor coupled among the wireless transceiver, the antenna, the user input components, the user output components, and the memory;
    a portable telecommunications device housing having a front side,
        wherein the portable telecommunications device housing is sized to be received within a user's hand;
    a display housing movable about the front side of the portable telecommunications device housing into first, second, and third differing positions;
    a sensor circuit coupled to the processor and configured to generate first, second and third differing position signals based respectively on positioning of the display housing at the first, second, and third positions;
    a first display device coupled to the processor, wherein the first display is carried by the display housing,
        wherein the processor is configured to provide first, second and third operating modes based respectively on receipt of the first, second, and third position signals;
        wherein the portable telecommunications device, in the first operating mode, displays status information to a user without user input, and wherein the first operating mode is a low power mode;
        wherein the portable telecommunications device, in the second operating mode, provides greater functionality to the user than the first operating mode, wherein the greater functionality includes more user input options and more user output information than in the first operating mode, and wherein the second operating mode is a higher power mode relative to the first operating mode; and
        wherein the portable telecommunications device, in the third operating mode, provides greater functionality to the user than the second operating mode, including providing more user input options and more user output information than in the second operating mode, and wherein the third operating mode is a higher power mode relative to the second operating mode; and
    a second display device coupled to the processor and carried by the portable telecommunications device housing,
        wherein the second display device is in a second plane parallel to a first plane;
        wherein the display housing is movable in the first plane in first, second, and third directions into the first, second, and third positions, respectively; and
        wherein the first direction is opposite the second direction and the third direction is perpendicular to the first and second directions.

2. The portable telecommunications device of claim 1, wherein the second display device is positioned on the front side and at or near an edge of the portable telecommunications device housing, wherein the first and second display devices are positioned for concurrent viewing by the user, and wherein the second display device is programmable with respect to information to display via the second display device.

3. The portable telecommunications device of claim 1 wherein the wireless transceiver includes components to exchange wireless communications over a cellular network and an IEEE 802.11 network, wherein the audio input component and audio output component include a port for an external microphone and earphone, and wherein the third mode permits the user to compose email messages, instant messaging (IM) messages, short messaging service (SMS) messages, multimedia service (MMS) messages, and social networking messages.

4. The portable telecommunications device of claim 1, further comprising:
at least first, second and third function buttons coupled to the processor and positioned at the edge of the portable telecommunications device housing and near the second display,
wherein the second display device is carried near an edge of the portable telecommunications device housing, wherein the processor is further configured to display first, second and third icons or labels on the second display and associated respectively with the first, second and third buttons, and wherein the first, second and third icons or labels on the second display change based on an application currently active on the portable telecommunications device, and wherein at least one of first, second or third functions associated respectively with the first, second and third buttons is a stored user-defined function.

5. The portable telecommunications device of claim 1, wherein the second display device is viewable in the first and third positions, but not in the second position.

6. The portable telecommunications device of claim 1 wherein the processor is further configured to access a network address book via the wireless transceiver and the wireless communications network, and to retrieve contact information for use in the second or third mode.

7. The portable telecommunications device of claim 1 wherein the display housing is smaller than the portable telecommunications device housing.

8. A mobile device configured to permit a user to exchange communications with at least one telecommunications network, the mobile device comprising:
a communications component configured to exchange communications with the telecommunications network;
memory;
at least a first display device;
user input and output components, including
audio components configured to facilitate voice communications, and
a keyboard configured to facilitate text communications;
at least one processor coupled among the communications component, the memory, the first display device, and the user input and output components;
a housing configured to at least partially enclose the processor, the communications component, the memory, the first display device, and the user input and output components,
wherein the housing carries an element configured for user manipulation into at least first, second, and third differing positions; and
a second display device coupled to the processor and carried near an edge of the housing,
wherein the second display device is in a second plane parallel to a first plane;
wherein the element is movable in the first plane in first, second, and third directions into the first, second, and third positions, respectively; and
wherein the first direction is opposite the second direction and the third direction is perpendicular to the first and second directions,
wherein the processor is programmed to cause the mobile device to enter first, second and third escalating levels of user interactivity with a user based respectively on manipulation of the element to the first, second, and third positions; and,
wherein the mobile device, in the first level of user interactivity, provides displays of information regarding received messages to the user without first requiring user input, and wherein the first level of user interactivity permits the user no or limited interaction with received messages;
wherein the mobile device, in the second level of user interactivity, initially permits the user to make or receive voice communications;
wherein the mobile device, in the third level of user interactivity, permits the user full interaction with the received messages, to make or receive voice communications, and to compose text messages with the keyboard; and
wherein the first, second, and third levels of user interactivity have first, second, and third power modes respectively, and wherein the second power mode is higher relative to the first power mode, and the third power mode is higher relative to the second power mode.

9. The mobile device of claim 8, further comprising:
at least first and second function buttons coupled to the processor and positioned at the edge of the housing and near the second display,
wherein the processor is further configured to display first and second icons or labels on the second display and associated respectively with the first and second buttons, and wherein the first and second icons or labels on the second display change based on an application currently active on the mobile device.

10. The mobile device of claim 8, wherein the element is a movable display portion that carries the first display device, and wherein the second display is viewable in the first and third positions, but not in the second position.

11. The mobile device of claim 8 wherein the communications component and the first display device are enabled in the third power mode, but not in the first power mode, and
wherein the processor is further configured to maintain a state from the third level of user interactivity to the first level of user interactivity if the processor is currently executing a selected application in the third level of user interactivity, and wherein the processor continues to enable the first display device.

12. A method for use with a mobile device configured to permit a user to exchange communications with at least one telecommunications network, the method comprising:
determining a user-selected mode, wherein the user-selected mode is at least a first mode, a second mode, or a third mode;
when in the first mode,
powering down at least some electrical components of the mobile device,
when in the second mode,
powering up at least a display of the mobile device, wherein the mobile device in the second mode operates at a power state higher relative to the first mode and lower relative to the third mode; and,
when in the third mode,
powering up at least a display of the mobile device, and, providing to the user more applications to use than in the first or second modes;
wherein the third mode provides more user input options than the second mode, wherein the second mode provides more user input options than the first mode, and wherein the number of user input options in the first mode is greater than one; and wherein determining the user-selected mode comprises determining a position of a display device, wherein the display device is movable in first, second, and third directions into first, second, and third positions, respectively, and wherein the first direction is opposite the second direction and the third direction is perpendicular to the first and second directions.

13. The method of claim 12, further comprising:

maintaining a state from the third mode to the first mode if the mobile device is currently executing a selected audio, video or digital picture application in the third mode, and continuing to enable the display.

14. The method of claim 12, further comprising:

identifying a contact from a text-based message in the third mode; and, automatically obtaining and providing a phone number for the contact from the text-based message when the mobile device moves to the second mode.

15. A mobile phone for use with a cellular telephone network, the mobile phone comprising:

a wireless transceiver for use with the cellular telephone network;

at least one antenna;

user input components, wherein at least one of the user input components is an audio input component;

user output components, wherein at least one of the user output components is an audio output component;

memory;

at least one processor coupled among the wireless transceiver, the antenna, the user input components, the user output components, and the memory;

a mobile phone housing having a front side;

a display housing movable about the front side of the mobile phone housing;

a secondary visual display device coupled to the processor and carried by the mobile phone housing and positioned on the front side and at or near an edge of the mobile phone housing; and, a primary visual display device separate from and larger than the secondary visual display device, wherein the primary visual display device is coupled to the processor;

wherein the primary visual display device is carried by the display housing and positioned near the secondary visual display device so that the user may concurrently view differing information displayed on both the primary visual display device and the secondary visual display device;

wherein the secondary display is programmable to display differing information based upon an application currently active on the mobile phone;

wherein the secondary display is in a second plane parallel to a first plane;

wherein the display housing is movable in the first plane in first, second, and third directions into first, second, and third positions, respectively;

wherein the first direction is opposite the second direction and the third direction is perpendicular to the first and second directions;

wherein the processor is programmed to cause the mobile phone to enter first, second and third escalating levels of user interactivity with a user based respectively on manipulation of the primary visual display device to the first, second, and third positions;

wherein the first, second, and third levels of user interactivity have first, second, and third power modes respectively; and wherein the second power mode is higher relative to the first power mode, and the third power mode is higher relative to the second power mode.

16. The mobile phone of claim 15, wherein in the first level of user interactivity, the secondary visual display device provides displays of information regarding received messages to the user without user input, and wherein the first level of user interactivity permits the user no or limited interaction with received messages and the primary visual display device does not display the received messages; and, wherein in the third level of user interactivity the mobile device permits the user full interaction with the received messages displayed on the primary visual display device.

17. The mobile phone of claim 15, further comprising first and second function buttons, and wherein the processor is further configured to display first and second icons or labels on the secondary visual display device for the first and second function buttons, respectively, and wherein the first and second icons or labels on the second display change based on the application currently active on the mobile phone.

18. The mobile phone of claim 15 wherein the processor is configured to provide first, second and third user interactivity modes for the mobile phone based respectively on the first, second, and third positions of the primary visual display device, and wherein the secondary visual display device is viewable in the first and third positions, but the secondary visual display device is covered by and not viewable when the primary visual display device is in the second position.

19. A tangible computer-readable medium storing instructions which, when operated by a wireless mobile device having first and second display devices, performs a method comprising:

receiving a user input signal;

determining whether the wireless mobile device is to operate in a first mode, a second mode, or a third mode based on the received user input signal;

when in the first mode, displaying status information on the second display device without user input, wherein the first display device does not display information;

when in the second mode, initially presenting to the user audio-related functionality not available in the first mode, and displaying information on the first display device, wherein the second display device does not display information; and, when in the third mode, permitting the user to create text-based messages displayed on the first display device, and, displaying additional information to the user on the second display device, wherein the user may simultaneously view both the first and second display devices, wherein the first, second, and third modes have first, second, and third power states respectively; and wherein the second power state is higher relative to the first power state, and the third power state is higher relative to the second power state;

wherein the second display device is in a second plane parallel to a first plane;

wherein the first display device is movable in the first plane in first, second, and third directions into the first, second, and third positions, respectively; and wherein the first direction is opposite the second direction and the third direction is perpendicular to the first and second directions.

20. The computer-readable medium of claim 19 wherein in the third mode, the mobile device provides at least first and second applications, and wherein the second display device provides first and second differing information to the user based on the first and second applications, respectively.

21. The computer-readable medium of claim 19, further comprising displaying status information on the second display device in the first mode, wherein the status information includes at least a portion of a received text-based message.

22. A mobile apparatus for use with a communications network, the mobile apparatus comprising:
communication means for exchanging communications with the communications network;
input means for receiving user input;
output means for receiving user output;
memory;
at least one processor coupled among the communication means, the input means, the output means, and the memory,
wherein the processor is configured to execute at least first, second and third different modes; and
wherein the first, second, and third modes have first, second, and third power states respectively, and wherein the second power state is higher relative to the first power state, and the third power state is higher relative to the second power state;
a first display means coupled to the processor; and,
a second display means coupled to the processor,
wherein the first display means is separate from the second display means,
wherein the second display means is movable with respect to the first display means,
wherein the second display means is not operable or viewable in at least one of the first, second and third modes,
wherein the second display means, in the third mode, provides supplementary information relative to information provided in the first display means,
wherein the second display means is in a second plane parallel to a first plane;
wherein the first display means is movable in the first plane in first, second, and third directions into first, second, and third positions, respectively; and
wherein the first direction is opposite the second direction and the third direction is perpendicular to the first and second directions.

23. A tangible computer-readable medium storing instructions which, when operated by a wireless mobile device having first and second display devices, performs a method comprising:
receiving a user input signal at the wireless mobile device;
determining whether the wireless mobile device is to operate in a first mode, a second mode, or a third mode based on the received user input signal;
when in the first mode,
providing a first set of functionality to the user at a first power state;
when in the second mode,
providing a second set of functionality to the user at a second power state, wherein the first set of functionality is a proper subset of the second set of functionality; and,
when in the third mode,
providing a third set of functionality to the user at a third power state, wherein the second set of functionality is a proper subset of the third set of functionality;
wherein the first, second, and third power states are different from each other;
wherein the first, second, and third modes include first, second, and third sets of user input options, respectively;
wherein the second display device is in a second plane parallel to a first plane;
wherein the first display device is movable in the first plane in first, second, and third directions into the first, second, and third positions, respectively; and
wherein the first direction is opposite the second direction and the third direction is perpendicular to the first and second directions.

24. The computer-readable medium of claim 23 wherein the first set of user input options includes two or more user input buttons, wherein the second set of user input options includes more user input buttons than the first set of user input options, and wherein the third set of user input options includes a full keyboard, wherein the full keyboard includes more user input buttons than the second set of user input options.

25. The computer-readable medium of claim 23 wherein the first mode comprises outputting visually perceptible information via a small display, wherein the second mode comprises outputting visually perceptible information via a large display, and wherein the third mode comprises outputting visually perceptible information via the small display and the large display.

* * * * *